Oct. 3, 1944.  W. KILCHENMANN  2,359,564
TWO-SHAFT OPPOSED-PISTON INTERNAL-COMBUSTION ENGINE
Filed July 7, 1942
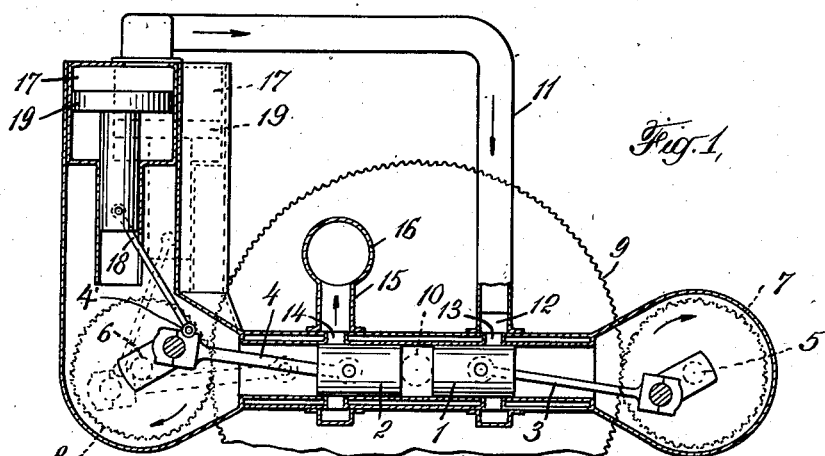
Fig. 1,
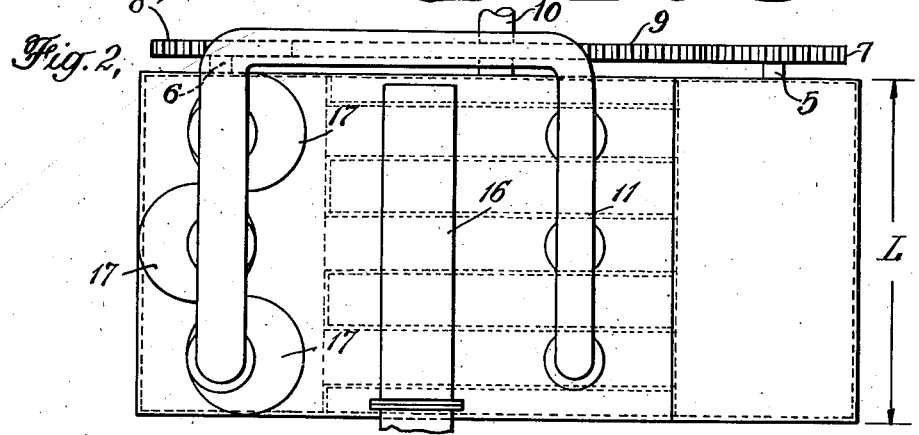
Fig. 2,
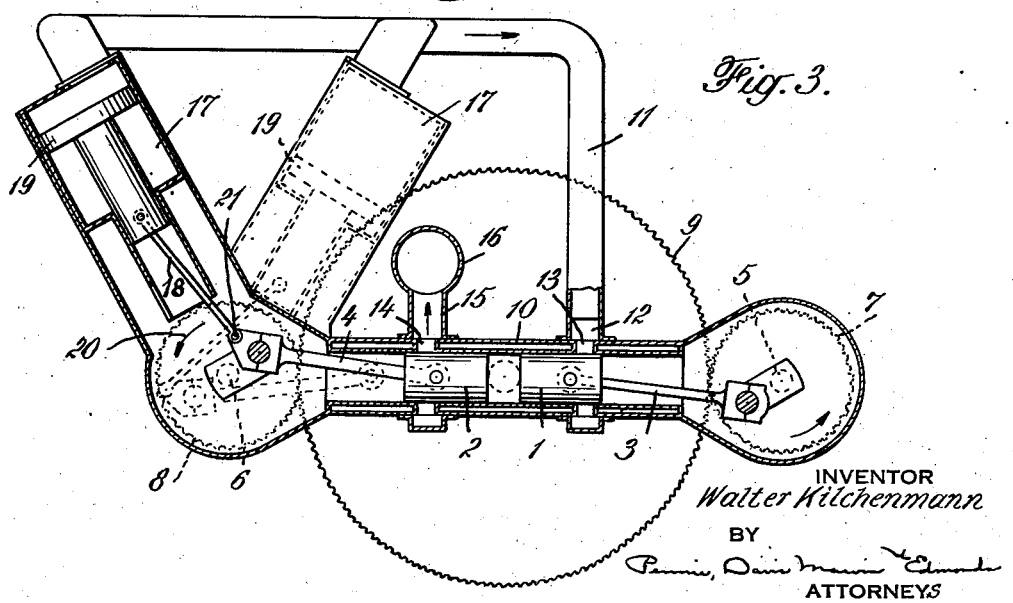
Fig. 3.
INVENTOR
Walter Kilchenmann
BY
ATTORNEYS Patented Oct. 3, 1944

2,359,564

UNITED STATES PATENT OFFICE 2,359,564

TWO-SHAFT OPPOSED-PISTON INTERNAL-COMBUSTION ENGINE

Walter Kilchenmann, Winterthur, Switzerland, assignor to Sulzer Frères, Société Anonyme, Winterthur, Switzerland Application July 7, 1942, Serial No. 449,993
In Switzerland November 8, 1941

3 Claims. (Cl. 123—51)

The invention relates to a two-shaft opposed-piston internal combustion engine in which a reciprocating pump is provided for each cylinder for delivering and compressing the combustion air. The invention is characterised by the cylinders of the reciprocating pumps being staggered in order to reduce the length of the engine.

Preferably the axes of the cylinders of the reciprocating pumps are inclined to each other in a V. The pistons of the pumps can for instance be linked to the connecting rods of the respective power cylinder pistons in such a way that the normal pressure exerted by the connecting rods on the power pistons is diminished. In opposed-piston internal combustion engines which work on the two-stroke cycle, it is preferable to link the pistons of the pumps to a driving element of the power pistons controlling the outlet ports.

Two examples of execution according to the invention are represented in a simplified manner in the drawing.

Figs. 1 and 2 show one example of execution in cross-section and in plan respectively and Fig. 3 the cross-section through the second example of execution.

The power pistons 1 and 2 move in opposite directions to each other and drive through the connecting rods 3 and 4, through the crankshafts 5 and 6 and through the pinions 7 and 8 a central gearwheel 9 keyed on the main shaft 10. The combustion air flows from the pipe 11 into the scavenging duct 12, from which it passes through the ports 13 into the combustion space of the cylinders. The products of combustion pass from the combustion space through the ports 14 and the duct 15 into the exhaust gas manifold 16.

For providing the scavenging air a reciprocating pump 17 delivering air into the pipe 11 is provided for each power cylinder. In order to be able to shorten the length L of the engine, the cylinders of the reciprocating pumps 17 are arranged staggered with respect to each other.

In the example of execution according to Figs. 1 and 2 the cylinders of the reciprocating pumps are parallel to each other, but are staggered with respect to a straight line, so that the distances between their axes measured in the direction of the length of the engine is less than the total of the overall cylinder diameters. It is thereby possible to arrange the power cylinders so close to each other that the length L of the engine is reduced to a minimum. The connecting rods 18 of the pistons 19 are linked by a joint 4' to the connecting rods 4 of the power pistons 2 which control the exhaust ports.

The reciprocating pumps 17 of the engine according to Fig. 3 are arranged obliquely to each other in the form of a V and can in this way be staggered with respect to each other. Through the connecting rods 18 the pump pistons 19 are linked to the connecting rods 4 of the pistons 2 controlling the exhaust ports 14, in such a way that the normal pressure exerted by the connecting rods 4 on the power pistons is diminished. The crankshaft 6 turns in the direction of the arrow 20. A normal pressure downwards is therefore exerted by the connecting rod 4 on the piston 2 during the combustion stroke. At the same time the pump piston 19 also presses on the joint 21 on the connecting rod 4 through the connecting rod 18. The normal pressure exerted on the power piston is thus diminished, since the crankpin bearing lies between the piston 2 and the joint 21 to which the connecting rod 18 is attached.

I claim:

1. An opposed-piston internal combustion engine having two crankshafts and a plurality of cylinders for the pistons connected to the crankshafts, a reciprocating pump for each cylinder for delivering compressed combustion air to the cylinder, each pump being located in a lateral position with respect to the cylinder of each pair of opposed pistons, each pump cylinder being staggered and inclined with respect to the adjacent pump cylinders and each pump-piston having its connecting rod connected to the connecting rod of an engine-piston.

2. A two-shaft opposed-piston internal combustion engine having two crankshafts and a plurality of cylinders for the pistons connected to the crankshafts, a reciprocating pump for each cylinder for delivering compressed combustion air to the cylinder, each pump being located in a lateral position with respect to the cylinder of each pair of opposed pistons, each pump cylinder being staggered with respect to the adjacent pump cylinders and each pump-piston having its connecting rod connected to the connecting rod of an engine-piston, the point of connection of the pump-piston connecting rod to the engine-piston connecting rod being spaced to one side of the point where the engine-piston connecting rod connects to the crank-shaft, whereby the normal pressure exerted by the engine-piston connecting rod on its piston is diminished.

3. A two-shaft opposed-piston internal combustion engine having two crankshafts and a plurality of cylinders for the pistons connected to the crankshafts, a reciprocating pump for each cylinder for delivering compressed combustion air to the cylinder, each pump being located in a lateral position with respect to the cylinder of each pair of opposed pistons, each pump cylinder being staggered with respect to the adjacent pump cylinders and each pump-piston having its connecting rod connected to the connecting rod of an engine-piston, the pump-piston connecting rod being connected to the engine-piston connecting rod at a point to one side of the point where the engine-piston connecting rod connects to the crank-shaft, said point to one side of the connection with the crank-shaft being so located that the crank-shaft serves as a fulcrum, whereby the pressure of the pump-piston rod tends to raise the engine-piston.

- WALTER KILCHENMANN.

CERTIFICATE OF CORRECTION.

Patent No. 2,359,564. October 3, 1944.

WALTER KILCHENMANN.

It is hereby certified that error appears in the printed specification of the above numbered patent requiring correction as follows: Page 1, second column, line 36, claim 2, and line 54, claim 3, for "A two-shaft" read --An--; and that the said Letters Patent should be read with this correction therein that the same may conform to the record of the case in the Patent Office.

Signed and sealed this 5th day of December, A. D. 1944.

Leslie Frazer (Seal) Acting Commissioner of Patents.